June 18, 1963  J. C. BUDDE ET AL  3,094,139
MIXING VALVE EMPLOYING A FLOW CONTROL-CHECK VALVE INSERT
Filed Oct. 3, 1957  2 Sheets-Sheet 1

INVENTORS.
JAMES C. BUDDE,
THOMAS E. NOAKES
BY
SMITH, WILSON, LEWIS & McRAE

United States Patent Office 3,094,139
Patented June 18, 1963

3,094,139
MIXING VALVE EMPLOYING A FLOW CONTROL-CHECK VALVE INSERT
James Clarence Budde and Thomas Edmund Noakes, Detroit, Mich., assignors to American Radiator & Standard Sanitary Corporation, New York, N.Y., a corporation of Delaware
Filed Oct. 3, 1957, Ser. No. 687,989
2 Claims. (Cl. 137—454.6)

This invention relates to a mixing valve useful for mixing hot and cold fluids, as for example in the mixing of hot and cold water prior to entry thereof into the tub of an automatic clothes washing machine.

Objects of the invention are to provide a mixing valve wherein:

(1) The valve can be controlled to provide at least three outlet temperatures, (2) The valve can be operated to deliver a predetermined quantity of fluid, irrespective of variations in inlet pressure of the hot and cold fluids, (3) The valve operates without the use of any thermally responsive valve devices, thereby eliminating the costs and testing procedures involved when these thermally responsive devices are employed, (4) The valve incorporates a unitary flow control-check valve insert in such manner as to reduce costs as compared with a structure wherein the flow control elements and check valve devices are positioned at various diverse positions in the valve housing, and (5) The above objects are achieved with a structure which economically employs a standard valve body housing structure, thereby enabling the manufacturer to construct a variety of valves with minimum tooling expense and parts inventory.

Other objects of this invention will appear in the following description and appended claims, reference being had to the accompanying drawings forming a part of this specification wherein like reference characters designate corresponding parts in the several views.

Figure 1:
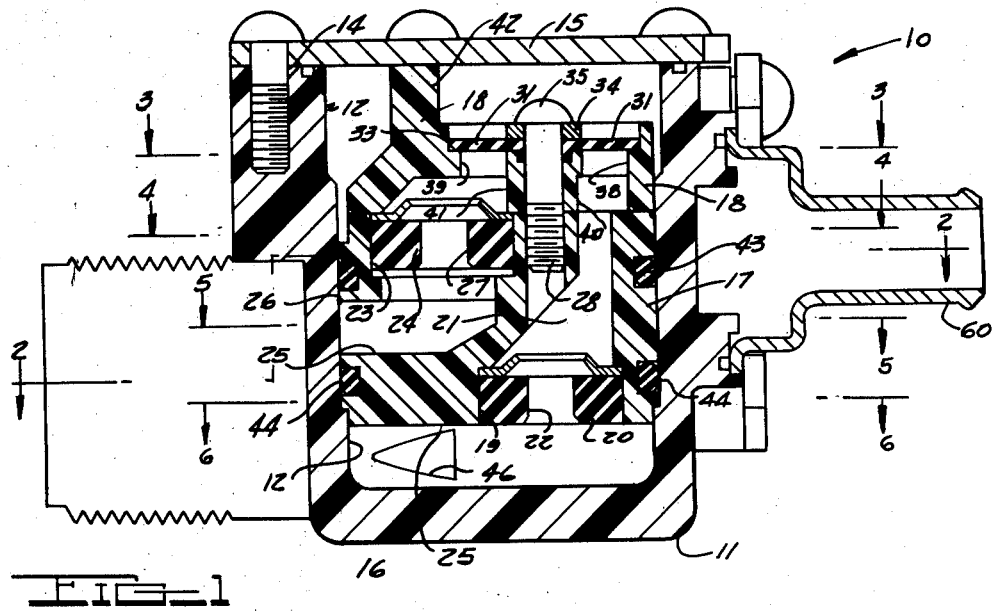
FIG. 1 is a sectional view through one embodiment of the invention, taken on line 1—1 in FIG. 2, with an insert being shown in top plan in order to show its exterior configuration of parts.
Figure 2:
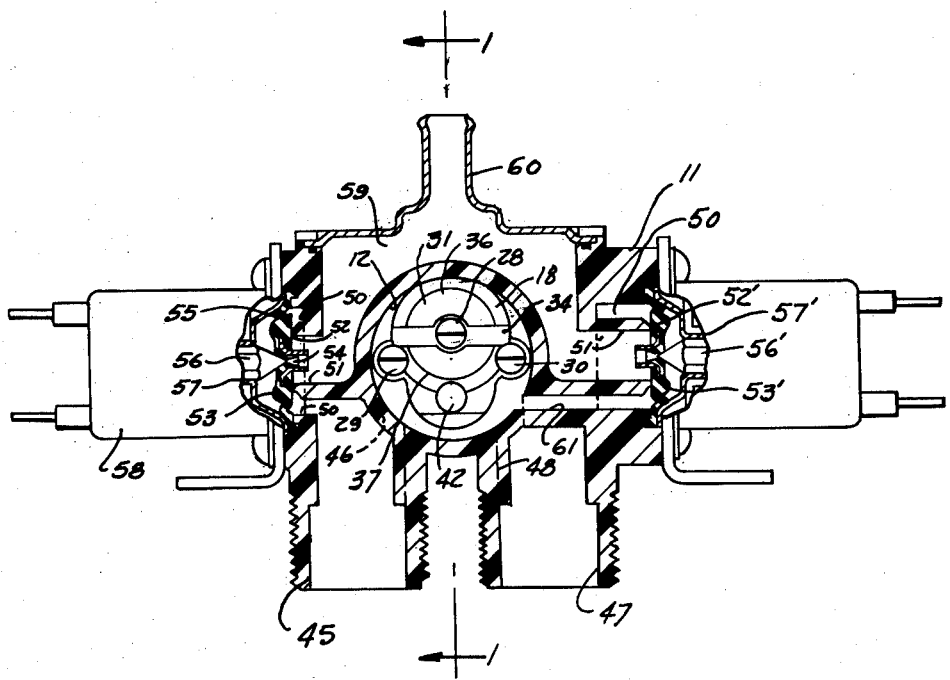
FIG. 2 is a sectional view taken substantially on line 2—2 in FIG. 1.
Figure 3:
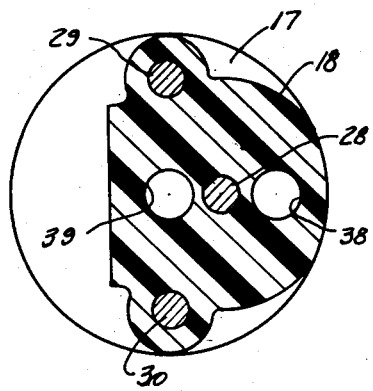
FIG. 3 is a sectional view of insert taken on line 3—3 in FIG. 1.
Figure 4:
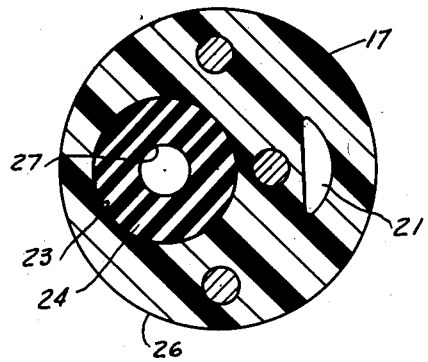
FIG. 4 is a sectional view of insert taken on line 4—4 in FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitations.

In the drawings there is shown a mixing valve 10 including a nylon valve housing 11 formed with a cylindrical recess 12 extending inwardly from housing surface 14. Recess 12 is closed by a cover plate 15.

A two piece nylon insert 16 is removably positioned in recess 12, and includes a generally cylindrical insert member 17 and overlying member 18. Member 17 is provided with a lower end face 25, which is hollowed out to form a cylindrical pocket 19. A resilient annular flow control element 20 of known construction is received within pocket 19 for maintaining constant flow conditions in hot fluid passage 21 formed downstream from pocket 19, it being understood that fluid flow in passage 21 is in an upward direction. The action of element 20 is such that increased upstream pressures cause the inner annular section of element 20 to deflect toward the element central axis so as to reduce the size of orifice 22 and thereby maintain a relatively constant volumetric flow in passage 21.

The upper end face of member 17 is hollowed out to form a cylindrical pocket 23, which receives a resilient annular flow control element 24 having the same construction and function as control element 20. A passage 25 extends from the cylindrical surface 26 of member 17 into fluid communication with the lower face of flow control element 24 to feed said element with its supply of cold fluid, it being understood that fluid flow through the flow control orifice 27 is in an upward direction.

The aforementioned insert member 18 is secured on member 17 by three screws 28, 29 and 30 extending through member 18 into threaded bores formed in the upper face of member 17. Screw 28 also extends through a resilient rubber disk 31 which is seated on recessed face portion 33 of member 17. An elongated brass retainer element 34 is positioned between disk 31 and screwhead 35 for positioning the disk on face portion 33. Retainer element 34 is of limited lateral dimension whereby to enable semi-circular disk portions 36 and 37 to flex upwardly about horizontal lines substantially parallel with the longitudinal axis of element 34.

Member 18 is provided with two orifices 38 and 39 which underlie respective ones of disk portions 36 and 37, the arrangement being such that the pressure of the fluids flowing through these orifices deflects the disk portions upwardly so as to permit flow of the fluids into the space between disk 31 and cover plate 15. Orifices 38 and 39 receive their fluid supplies from passages 40 and 41, which communicates with passage 21 and flow control orifice 27, respectively. The cylindrical projection at 42 abuts against cover plate 15 so as to prevent axial shifting of insert 16 (formed by members 17 and 18); it is however of limited lateral dimension and therefore does not interfere with fluid flow in the space immediately below the cover plate. Fluid leakage around the cylindrical surface of insert 16 is prevented by O rings 43 and 44.

Figure 5:
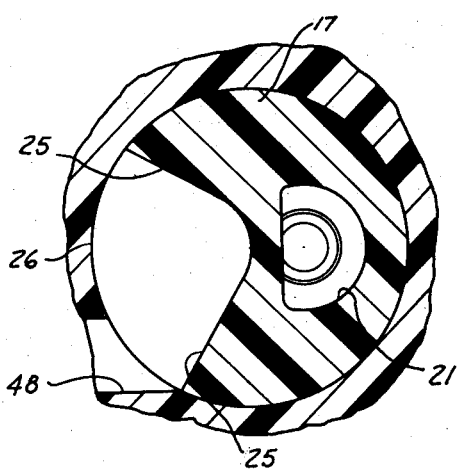
FIG. 5 is a sectional view of insert taken on line 5—5 in FIG. 1.
Figure 6:
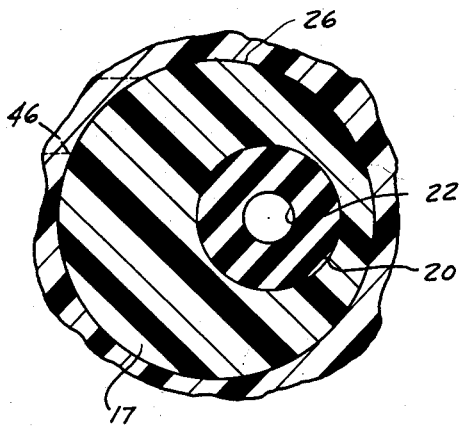
FIG. 6 is a sectional view of insert taken on line 6—6 in FIG. 1.

Cold fluid is supplied to the mixing valve through a coupling 47, which discharges into a passage 48. Passage 48 communicates with passage 25 (FIG. 5), whereby to feed flow control element 24 with cold fluid.

Hot fluid is supplied to the mixing valve through a coupling 45, which discharges into a passage 46. Passage 46 in turn empties into the lowermost portion of recess 12 (as shown in FIG. 1) so as to feed annular control element 20 with hot fluid.

Coupling 45 also connects with an annular passage 50, which surrounds a passage 51, said two passages cooperating to define an annular valve surface 52. A flexible diaphragm 53 overlies surface 52 to coact therewith in controlling fluid flow from passage 50 into passage 51. Diaphragm 53 is provided with a central opening 54 and a bleed opening 55. An armature plunger 56 is arranged in a fixed guide 57 to move toward and away from opening 54, the arrangement being such that when solenoid 58 is electrically energized plunger 56 is withdrawn away from opening 54 so as to permit the fluid pressure in passage 50 to hold the diaphragm open. When solenoid 58 is de-energized a compression spring in the outer end of guide 57 (not shown) urges plunger 56 to a position closing opening 54; as a result the fluid in passage 50 is enabled to flow through bleed opening 55 so as to develop a pressure on the outer face of the diaphragm sufficient to force it into a closed position against valve surface 52.

Passage 51 discharges into an outlet chamber 59 partially formed by a spigot 60. The outer end of this spigot is adapted to receive a flexible tube leading to the tub of an automatic clothes washing machine (not shown) for introducing water from valve 10 into the tub during the wash and rinse cycles. Operation of solenoid 58 is timed with the washing machine cycle by timer mechanism not part of the present invention.

The hot fluid in passage 46 travels through flow control orifice 22 and then through check valve orifice 38. The cold fluid in passage 48 flows through flow control orifice 27 and then through check valve orifice 39, after which it mixes with the hot fluid coming from orifice 39. The mixed temperature fluid is then discharged into a passage 61, which communicates with an annular passage 50'. Passage 50' surrounds an outlet passage 51' to define an annular valve surface 52'. Fluid flow from passage 50' into passage 51' is controlled by a diaphragm 53' operating in the same manner as previously described diaphragm 53; accordingly similar "primed" reference numerals are employed for similar parts. Passage 51' discharges into chamber 59 where it mixes with the fluid issuing from passage 51.

From the above description it will be appreciated that when diaphragm 53 is open and diaphragm 53' is closed the fluid issuing from spigot 60 will be at a maximum temperature (determined by the temperature of the fluid supplied to coupling 45).

When diaphragm 53 is closed and diaphragm 53' is open all of the hot fluid from coupling 45 must pass through passage 46 and orifices 22 and 38, after which it is mixed with the cold fluid coming from coupling 36 via passage 48 and orifices 27 and 39; consequently, the fluid issuing from spigot 60 is at a relatively low temperature.

When diaphragms 53 and 53' are both open the hot fluid through passage 51 is mixed with the "low temperature" fluid from passage 51' to produce an intermediate temperature fluid.

It is contemplated that further outlet temperatures can be achieved by equipping the valve with an additional solenoid-operated diaphragm in a passage leading directly from cold fluid coupling 47 to outlet chamber 59. With such a construction two additional outlet temperatures could be achieved.

However the present invention is concerned primarily with flow control-check valve insert 16, and since the operation of insert 16 would be the same with the addition of the third diaphragm it was not considered necessary to illustrate the additional diaphragm in the present drawings.

We claim:

1. A mixing valve comprising a valve housing formed with a cylindrical recess therein; a cylindrical insert member seated within said recess but having its innermost end face spaced from the recess bottom wall so as to form an inlet chamber; a cylindrical pocket formed in said innermost face; a resilient flow control element carried in said pocket; a second cylindrical pocket formed in the outermost end face of the insert member; a resilient flow control element carried in said second pocket; a passage extending from the first pocket to the outermost end face of the insert member whereby to convey fluid from the first flow control element; a second passage extending from the cylindrical face of the insert member to the second pocket whereby to feed the second flow control element with fluid; means defining separate inlets for the valve in fluid communication with said inlet chamber and second passage, respectively; a second insert member carried on the aforementioned outermost end face of the first insert member; an orifice extending through said second insert member into communication with the first passage; a second orifice extending through said second insert member into communication with the second flow control element; a flexible disk carried on the downstream face of said second insert member and overlying the aforementioned orifices, whereby to act as a check valve for each of the fluid streams issuing from the flow control elements; and means defining an outlet for the mixing valve in fluid communication with the downstream face of the flexible disk.

2. A mixing valve comprising a valve housing formed with a cylindrical recess extending inwardly from one of its external faces; a cover plate closing the outer end of said recess; tubular hot and cold fluid inlet couplings for said valve housing; a hot fluid passage leading from the hot fluid inlet coupling into the cylindrical recess at a point adjacent the bottom wall thereof; a cold fluid passage leading from the cold fluid coupling into the cylindrical recess at a point spaced outwardly from the first mentioned point; a cylindrical insert member positioned in and closely fitting said recess, but spaced from the recess bottom wall to allow fluid from the hot fluid passage to be received in the recess; a cylindrical pocket formed in the innermost end face of the insert member; a resilient flow control element carried in said pocket; a second cylindrical pocket formed in the outermost end face of the insert member; a resilient flow control element carried in said second pocket; a passage extending from the first pocket to the outermost end face of the insert member whereby to convey hot fluid from the first flow control element; a second passage extending from the cylindrical face of the insert member adjacent the aforementioned second point in the recess to the second pocket whereby to feed the second flow control element with fluid; a second insert member carried on the aforementioned outermost end face of the first insert member; an orifice extending through said second insert member into communication with the first passage; a second orifice extending through said second insert member into communication with the second flow control element; a flexible disk carried on the outermost end face of the second insert member and overlying the aforementioned orifices, whereby to act as a check valve for each of the fluid streams issuing from the flow control elements; a first annular passage formed in said valve housing; a passage in the valve housing directly connecting the hot fluid inlet coupling with said annular passage; a passage concentrically located within said annular passage and cooperating therewith to define an annular valve surface; a diaphragm extending across the annular passage and seatable on the valve surface to interrupt fluid flow into the concentrically located passage; solenoid means for operating said diaphragm; a second annular passage formed in said valve housing; a passage in the valve housing leading from the space in the cylindrical recess between the cover plate and flexible disk to the second annular passage; a passage concentrically located within said second annular passage and cooperating therewith to define a second annular valve surface; a second diaphragm extending across the second annular passage and seatable on the second valve surface to interrupt fluid flow into the second concentrically located passage; solenoid means for operating said second diaphragm; and a spigot structure secured on the valve housing and cooperating therewith to define an outlet chamber in communication with both of said concentrically located passages.

References Cited in the file of this patent

UNITED STATES PATENTS

| | | |
|---|---|---|
| 1,225,744 | Barker | May 15, 1917 |
| 2,442,886 | Bowen | June 8, 1948 |
| 2,528,422 | Chace | Oct. 31, 1950 |
| 2,542,279 | Kempton | Feb. 20, 1951 |
| 2,576,894 | VanRanst | Nov. 27, 1951 |
| 2,620,134 | Obermaier | Dec. 2, 1952 |
| 2,672,089 | Johnson | Mar. 16, 1954 |
| 2,698,027 | Branson | Dec. 28, 1954 |
| 2,708,092 | Smith | May 10, 1955 |
| 2,800,137 | Fraser | July 23, 1957 |
| 2,826,367 | Cobb | Mar. 11, 1958 |